United States Patent [19]

Eickmann

[11] 4,171,784

[45] Oct. 23, 1979

[54] COMBINATION ROAD AND AIR VEHICLE HAVING A LOWERABLE CHASSIS

[76] Inventor: Karl Eickmann, 2420 Isshiki, Hayama-machi, Kanagawa-ken, Japan

[21] Appl. No.: 821,683

[22] Filed: Aug. 4, 1977

Related U.S. Application Data

[62] Division of Ser. No. 539,685, Jan. 9, 1975, abandoned.

[30] Foreign Application Priority Data

May 4, 1973 [AT] Austria .............................. 3968/73

[51] Int. Cl.² ............................................ B64C 37/00
[52] U.S. Cl. ................................. 244/2; 244/102 R; 244/12.4; 244/23 A
[58] Field of Search .................. 244/12, 2, 23, 100 R, 244/102 R, 53 R, 93, 17.17, 17.11, 17.23; 180/66 R, 116, 117, 126, 89.13

[56] References Cited

U.S. PATENT DOCUMENTS

| 1,057,246 | 3/1913 | Kirkpatrick | 244/93 |
| 2,428,475 | 10/1947 | Swaab | 244/93 |
| 3,153,384 | 10/1964 | Castle, Jr. et al. | 244/53 R UX |
| 3,253,806 | 5/1966 | Eickmann | 244/53 R |
| 3,494,575 | 2/1970 | Budworth | 244/23 R |
| 3,503,574 | 3/1970 | Eickmann | 244/17.17 |
| 3,614,029 | 10/1971 | Eickmann | 244/17.23 |
| 3,827,527 | 8/1974 | Bertelsen | 244/23 A |
| 3,961,681 | 6/1976 | Fisher | 180/66 R |

FOREIGN PATENT DOCUMENTS 935884   9/1963   United Kingdom .................. 244/23 R Primary Examiner—Galen L. Barefoot

[57] ABSTRACT

A vehicle for traveling in the air and/or on the ground is equipped with two, four, or eight propellers on vertical shafts, each driven by a rotary hydraulic motor of the radial-piston type. The motor may comprise two rotors which are connected in individual hydraulic circuits supplied with fluid from different hydraulic pumps. One embodiment of the vehicle comprises an automobile with the propellers mounted in oblique air ducts or in shrouds pivotable in the travel direction. Each rotor of the hydraulic motors is coupled to the shaft unidirectionally so that in case of failure, the shaft can be driven by the other rotor. Each hydraulic pump preferably produces four equal fluid flows and comprises two rotors on a common shaft, each rotor with two separate groups of cylinders, the eccentricity of at least one of the rotors being adjustable. Both the hydraulic motor and the pump have inlet and outlet connections on the radial periphery of the housing. The pumps and the engine are mounted on a lowerable and retractable substructure which may lowered below the body of the vehicle at flight in air and be retracted into the body of the vehicle when travelling on the ground.

22 Claims, 20 Drawing Figures

COMBINATION ROAD AND AIR VEHICLE HAVING A LOWERABLE CHASSIS

This application is a divisional of U.S. application Ser. No. 539,685, filed Jan. 9, 1975, was abandoned.

FIELD AND BACKGROUND OF THE INVENTION

This invention relates in general to combined air-land-water vehicles and, in particular, to a new and useful vehicle of this type which is particularly reliable in operation and secure as an aircraft and, in some embodiments, adapted to take off or go down into highway traffic.

DESCRIPTION OF THE PRIOR ART

Hydrostatical drive systems in which power received from a driving engine is transmitted to the rotors of a vehicle through fluid pressure are well-known, for example, from the inventor's prior U.S. Pat. No. 3,457,808. Also well-known is the driving of aircraft by means of hydrostatically driven propellers.

The known aircrafts with static pressure driven propellers may be divided into two groups which are:
 (a) not reliable in operation; and
 (b) reliable in operation.

In the drive systems of non-reliable aircrafts, the main pressure fluid flow is branched into several flows for driving several propeller motors whereby a communication is established between the motors which, consequently, may rotate at mutually different speeds with the aircraft exposed to the risk of tilting and crashing. If, on the other hand, a series-connection is used, the aircraft cannot be held in a straight and horizontal position while starting or landing. Aircrafts of this type, i.e., with hydrostatic propeller driving systems not reliable in operation, are known, for example, from U.S. Pat. Nos. 2,212,490; 2,454,138, 2,514,128 and British Pat. No. 364,510. Aircrafts with drive systems which are reliable in operation, on the other hand, use either hydrostatic motors series-connected in the flight direction or motors supplied with separate pressure fluid flows having mutually equal flow rates so that the synchronism of the propellers is assured, a tilting is prevented, and the aircraft is secure. Such aircraft are known, for example, from U.S. Pat. Nos. 3,211,399; 3,245,637; 3,353,806; 3,253,807; 3,260,489; 3,345,016 or 3,614,029.

The non-reliable aircraft can hardly be used in service, since due to the hydraulic intercommunication between the motors, a synchronous rotation cannot be assured and there is always a risk of crashing as soon as the propeller speeds become substantially different.

It is true that hydrostatically driven non-reliable aircraft are, in addition, provided with control means which theoretically serve to ensure the security of the flight. In reality, however, such means cannot make the vehicle reliable in a satisfactory manner. That is, a system in which a main fluid flow is branched into several partial flows with the use of flow-volume regulators is controllable, in principle, only through the variation of the cross-sectional areas. If such a system meets with stronger air gusts or the aircraft flies through turbulence, the propellers are unequally loaded, and it becomes practically impossible for the control to react quickly enough. Therefore, even aircraft equipped with such a control but otherwise not reliable, are not safe. Fixed wing aircraft with a plurality of propellers driven by hydrostatic motors which are supplied with partial flows branched off a common fluid flow are not controllable during the starting and landing because, at that time, the controlling surfaces of the aircraft have no sufficient hold and there is no provision in the hydraulic system for controlling the speed of the motors.

As for the driving machines, hydraulic radial-piston motors and pumps are well known in the art. For use in air-craft, however, propeller driving motors comprising a single cylinder block or rotor are not sufficiently reliable because any failure in the rotor or in the respective supply or return circuit or in the hydraulic pump or driving engine stops the propeller. Even if two rotors are provided, which are not independently supplied or cannot be disconnected from each other, a failure in any part of the supply system may have the same disastrous effect. Multiple-flow pumps producing more than two pressure-fluid flows are also known, for example in U.S. Pat. No. 3,270,685. However, in this known construction of a four-flow pump, the working fluid is fed into the rotor and also discharged radially from the inside through ports and passages provided in a control shaft extending through the rotor bore. In themselves, such four-flow machines have proved to be very satisfactory even as hydrostatic high-torque motors. However, the shortcoming of the machines supplied radially from the inside is that the control shaft must have a relatively large diameter so as to be able to receive the four inlet and four outlet fluid passages, or the fluid passages must be so narrow that only a small quantity of fluid can flow therethrough. In the first case, i.e., if a shaft with a large diameter is used, it is disadvantageous that the friction between the shaft and the rotor becomes relatively high and also that the larger diameter of the shaft necessarily leads to a wider fit clearance between the rotor and the shaft and thereby to a considerable leakage, because the leakage losses increase with the third power of the clearance width. In the second case, i.e., if a shaft with a small diameter is used, it is disadvantageous that the fluid flow through the passages is so small that the machine is suited only for very limited performances or its efficiency drops to unbearable values due to too high hydraulic losses. Because of the just-mentioned drawbacks, the known four-flow pumps and motors are incapable of offering efficiencies and performances satisfying the high demands made on four-wheel or four-propeller drives for land vehicles or aircraft and all the less or more powerful drives.

SUMMARY OF THE INVENTION

In accordance with the invention, the mentioned drawbacks of the prior art are avoided, and an air-land-water vehicle is provided having a drive system which is most reliable in operation and service and practically eliminates any danger for the crew which could arise from a failure of the propelling means.

The present invention concerns only the group of vehicles indicated above as reliable in operation, that is, vehicles having hydraulically driven propellers and a hydraulic system providing either a series-connection of several hydraulic motors in a single fluid flow or a parallel connection of several hydraulic motors connected in individual fluid-flows entirely separated from each other and having flow rates which are mutually equal or in a fixed porportion, the purpose in both cases being to synchronize the rotational speed of the propellers.

In such vehicles, particularly aircraft which are supported in the air by rotor blades or enclosed propellers, the invention permits control of the horizontal displacement in respect to the vertical motion by providing means for varying, within a very small range, the speed of the propellers mounted ahead in the travel direction as compared to the speed of the propellers mounted in the rear. For example, the hydraulic motor or motors driving the propellers mounted ahead are provided with a slightly larger volumetric fluid consumption capacity relative to the motors driving the propellers behind. Another provision, in accordance with the invention, is to increase the operational security by providing hydraulic motors comprising two or even more rotors driving a common shaft and coupled thereto in only one direction of rotation, the rotors being independently supplied by separate pressure-fluid flows. This means that the shafts driving the propellers continue to operate even if one of the pressure fluid flows is interrupted or one of the rotors gets hot or jammed. Consequently, vehicles thus equipped may start and land reliably even upon failure of one of the rotors or one of the supply or return lines. Their reliability is such that they can be flown even by inexperienced pilots, especially when the equipment includes a radar control of the aircraft inclination and when designed as air-land vehicles in the form of an automobile, can also take the air out from the traffic on a highway or securely touch down into such highway traffic.

In a first embodiment of the invention, the vehicle is equipped with two rotor blades or propellers mounted on vertical shafts and disposed one behind the other in the travel direction. The shafts are driven by hydraulic motors which are connected in two entirely separate parallel pressure fluid flows, and the delivery-to-capacity ratio between the fluid pressure producing pump and the motors is different for the motor mounted ahead and the motor mounted in the rear. This difference is, of course, limited to an extent permitting a small inclination of the vehicle in the forward direction but preventing an inclination beyond an acceptable value. A stable flight position is thereby assured in all circumstances and the aircraft cannot crash.

In another embodiment of the invention, two propellers are mounted ahead and two in the rear in the travel direction, and four separate parallel fluid flows are provided to drive the hydraulic motors of which the two ahead have a mutually equal delivery-to-capacity ratio and the two in the rear have a slightly different but also mutually equal delivery-to-capacity ratio, the small difference between the two ratios determining the inclination of the vehicle to the horizontal plane.

According to another embodiment of the invention, means are provided permitting the adjustment within a small range, the capacity of the hydraulic motors, those ahead or those in the rear, or to similarly adjust the effective volume of the respective one of the delivery chamber groups, i.e., cylinder groups of the fluid-pressure producing pump. Thereby, the speed of one half of the propellers can be varied within a small but sufficient range relative to the unchanged speed of the other propellers so that the inclination and the desired forward motion of the vehicle may be controlled. At the same time, a security is given by the limiation of the variation range so that should the pilot make an operational mistake, the inclination cannot become excessive, and the aircraft cannot tilt.

In another embodiment of the invention, the speed difference between the propellers ahead and the propellers in the rear is obtain analogously by adjusting slightly smaller effective volumes of the cylinder groups associated with the motors ahead and located in the respective driving pump as compared to the delivery volumes of the cylinders associated with the motors behind, while the capacities of all of the hydraulic motors remain mutually equal.

According to another embodiment of the invention, one or more hydraulic pumps are directly driven, at mutually equal speeds, by a common driving engine, such as an internal combustion engine, a gas turbine or the like, and comprise a total of at least four groups of cylinders which groups are completely separated from one another and wherefrom four corresponding groups of cylinders in the propeller driving hydraulic motors are supplied with four separate pressure-fluid flows through uninterrupted fluid conduits. All of the hydraulic motors are thereby forced to operate at the desired same speed because, together with the conduits, the respective motor cylinders, for example, increasing their volumes in a certain operational phase, and the pump chambers, for example, decreasing their volumes at that time, form a self-contained closed space permitting no fluid escape. Consequently, any inwardly directed stroke of a piston in the pump necessarily produces an outwardly directed stroke of a piston in the motor and any angular motion in the pump is forcibly accompanied by a corresponding angular motion in the motor or, more accurately, by a corresponding angular motion of at least four motors since the system comprises four groups of cylinders.

Still another embodiment of the invention is provided in which all four cylinder groups are united in a reliably operating four-flow pump enclosed in a common casing, and a common reaction ring is provided for all of the pistons of the four groups of cylinders so that during the rotation of the pump rotor, parallel strokes, i.e., equal or proportional strokes, are produced in all of the cylinder groups resulting in a proportional or synchronous rotation of the at least four hydraulic motors which are connected in the four separate fluid flows furnished by the pump.

In order to obtain a fail-safe operation and to eliminate any danger of crashing, another embodiment of the invention provides an individual driving of all propellers by hydrostatic motors, each comprising two unidirectionally free-wheeling rotors. Such a motor has the advantage, that in case of failure of one of the rotors due, for example, to a fracture or jamming, the stopped rotor is automatically disengaged from the shaft and the other rotor continues to drive the shaft and the propeller. Thus, the propeller cannot stop rotating and the aircraft can securely continue its flight or land. Another feature closely connected to this embodiment is that both rotors in such a motor are mounted in separate pressure-fluid flows which are connected in parallel and whose rates of flow are mutually equal. In such a connection, in case of failure of one of the rotors, the speed of the propeller is not affected either. To assure the highest reliability in operation and to secure the vehicle against any accident, the parallel and separate pressure fluid flows, supplied to the two rotors of the hydraulic motor, are furnished by multiple pressure-fluid producing means, such as multiple-flow pumps, which are individually driven by separate driving engines, such as internal-combustion engines, gas turbines, or the like.

Owing to this arrangement, one rotor is still driven even if a pump is destroyed by fracture pieces getting into the hydraulic circuit of the wrecked rotor or if the second driving engine fails. It is possible to provide manually or automatically operated switch valves by which the pressure fluid flow supplying the faulty rotor is, in addition, directed to the running rotor. Thus, the full power of all of the still working driving engines can be used for driving the propellers.

Another feature of the invention is the improved operational reliability and efficiency of the multiple-flow pump obtained by providing pressure inserts at the two axial ends of the pump, and the provision of a shaft passing through the whole housing of the pump and permitting mounting on the shaft of auxiliary pumps, for example, a priming pump, a control pump, etc.

A major part of the invention relates to embodiments of a road-air vehicle capable of being admitted both as an automobile on the highways and as an aircraft. It is adapted to start from among the traffic on a highway and to go down again in the same manner. This means that conditions are to be met which up to date have not been complied with by any of the known vehicles. For example, a road vehicle must not be substantially wider than 2.50 meters to be allowed on the road. In addition, the vehicle must be able to travel as fast or as slow as the other vehicles on the road. Also, it must not have unprotected propellers which could injure persons or damage other vehicles and, finally, it must be able to move, accelerate, and brake in the air at the same speed as the vehicles on the road in order to be capable of alighting safely between two vehicles running on the highway. In consequence, one of the embodiments of the present invention is intended to comply with all of the foregoing requirements. In this embodiment, at least one shrouded propeller in vertical or inclined position is mounted in front of the pilot's cabin and a corresponding propeller is mounted in the rear. The outer diameter of the shrouds is smaller than the admissible width of the road vehicle. It is preferable, according to another embodiment of the invention, to provide two shrouded propellers in front of the pilot's cabin and two behind the cabin. The propellers are driven by speed-synchronized hydraulic motors of the reliable construction mentioned above. Because small propellers require a very high power supply for lifting a loaded vehicle into the air, the inventive embodiment provides two or four shrouded propellers for cases where a high fuel consumption is acceptable. Another embodiment, in accordance with the invention, which includes four shrouded propellers in front of the pilot's cabin and four propellers behind the pilot's cabin is intended for an economical design using a reduced driving power, and provides a vehicle of the size of today's heavy automobiles. Thereby, with such an arrangement, a larger mass of air is driven through the air ducts in which the propellers are mounted and, consequently, the lifting force per HP increases and the vehicle operates very economically.

In still another embodiment of the invention, the propellers are mounted in obliquely positioned shrouds of a particular shape so that at high speed in the air, the shrouds act as lifting surfaces. In a further embodiment of the invention, the shrouds, the propellers and the driving hydraulic motors are pivotally mounted so that the thrust angle may be varied and the vehicle may also be efficiently braked in the air. Still another embodiment of the invention provides a substructure carrying the heavy parts of the driving mechanism and adapted to be lowered and retracted automatically in order to permit a displacement of the center of gravity and thereby improve the stability of the vehicle in the air. Other embodiments deal with actuating and controlling means.

Accordingly, it is an object of the invention to provide a vehicle capable of traveling in the air, on land or on water surfaces, equipped with at least two propellers on vertical shafts which are driven by rotary hydraulic motors, the security of operation being ensured by providing at least two rotors in each of the hydraulic motors, each rotor being driven individually by a completely separate hydraulic fluid flow produced in a hydraulic pump having its own driving engine, the hydraulic circuits being connected crosswise so that the different rotors of one motor are driven by different pumps, the speed of some of the propellers being adjustable and possibly switch valves being provided for interconnecting the individual circuits.

Another object of the invention is to provide a rotary pressure fluid operated motor of the radial piston type, reliable in operation, comprising at least two rotors on a common shaft, each rotor being driven by a separate fluid flow and connected to the shaft by means of a coupling of the frictional ratched-wheel shaft type permitting the shaft, in case of any failure in the drive train of one rotor, to still be rotated by another rotor while being decoupled from the faulty one, and additional end-thrust bearings being provided for supporting the rotors axially.

Another object of the invention is to provide a pressure fluid operated machine of the radial-piston type in which, for reasons of constructional advantages and mounting facilities, the inlet and outlet fluid connections are provided on the radially outer periphery of the machine.

Another object of the invention is to provide a vehicle capable of traveling both in the air and on highways, of the design of an automobile, equipped with a plurality, preferably eight, propellers mounted in air ducts or coleopteric shrouds provided within the vehicle body and oriented obliquely upwardly in the travel direction, the propellers being driven individually by reliable rotary hydraulic motors eight comprising at least two rotors, the different rotors in one motor being driven by fluid flows individually produced in different pumps, the vehicle being steered by rudder, elevator, and yaw stabilizing means, and a lowerable substructure being provided for stabilizing the vehicle in the air on which the heavy parts of the machinery may be located.

Another object of the invention is to provide an airborne vehicle capable of landing on the ground or on water surfaces, equipped with four propellers on vertical shafts individually driven by reliable rotary hydraulic motors, in which the motors are supported on four arms constituted by the hydraulic conduits and the speed of two of the propellers may be varied by means of flow volume regulators mounted in hydraulic conduits bypassing the respective motors.

Another object of the invention is to provide a rotary pressure fluid operated pump of the radial-piston type producing four separate, mutually equal fluid flows of which two are adjustable as to the rate of flow, comprising, two rotors on a common shaft each formed with two separate groups of cylinders and means for adjusting either the eccentricity of the reaction ring of one of the rotors or the flow volume in the inlet fluid passages.

Another object of the invention is to provide a vehicle capable of traveling both in the air and on highways, designed as an automobile, equipped with four to eight propellers driven individually by reliable rotary hydraulic motors each comprising two rotors connected in separate hydraulic circuits supplied from different pumps, the motors and propellers being placed in shrouds which are pivotally mounted in trifurcate extensions of the vehicle body and angularly adjustable within a range of 360° in the travel direction, a simultaneous adjustment of the angular position of the shrouds being effected by means of bar connections, the horizontal steering being effected by means of a rudder, and a lowerable and retractable sub-structure being provided for stabilizing the vehicle in the air and to facilitate its landing.

Another object of the invention is to provide a rotary pressure fluid operated pump of the radial-piston type for producing a plurality, at least three and preferably four, fluid flows which are in a fixed proportion, preferably equal to each other and may be varied simultaneously or individually comprising, in its preferred embodiment for high pressures, a shaft mounted in a housing with two covers, a rotor formed with four separate groups of cylinders and two axial end surfaces having radially offset and axially spaced contact surfaces, in each of the contact surfaces being provided with fluid ports connecting with one of the cylinder groups, two stationary pressure inserts at each axial side of the rotor concentric of the shaft and one received in the other and both held in place by the covers of the housing, the pressure inserts having inner end surfaces conformable to the rotor end surfaces and accommodating fluid ports cooperating with the fluid ports of the rotor and connecting with inlet and outlet fluid passages which, at the outer axial ends of the pressure inserts, form outer ports opening to the inlet and outlet passages provided in the covers, the pressure inserts being formed with eccentric shoulders adjacent the outer ports and forming, together with respective recesses provided in the covers, narrow pressure chambers having the effect, during operation, that the pressure inserts and thereby the stationary inner surfaces are pressed into a sealing contact with the corresponding rotor end surfaces. As far as pumps, motors or fluid handling devices are mentioned herebefore it should be understood, that they are especially suitable for application in the vehicle of this invention. They could however also be used in transmissions or for operating machines or other devices. Therefore, they cannot only be used in the vehicles of this invention, but also otherwise, if suitably applied.

Further, as far as in this specification a discussion of two or four or eight motors appears, it should be understood, that in modified embodiments of the vehicle of this invention, which are not specifically shown in the drawings, any other number of a plurality of motors can be applied, if suitably connected and supplied with fluid under pressure in respective fluid pressure lines of the vehicle.

The various features of novelty which characterize the invention are pointed out with particularly in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

GENERAL DESCRIPTION OF THE PREFERRED EMBODIMENTS

Figure 1:
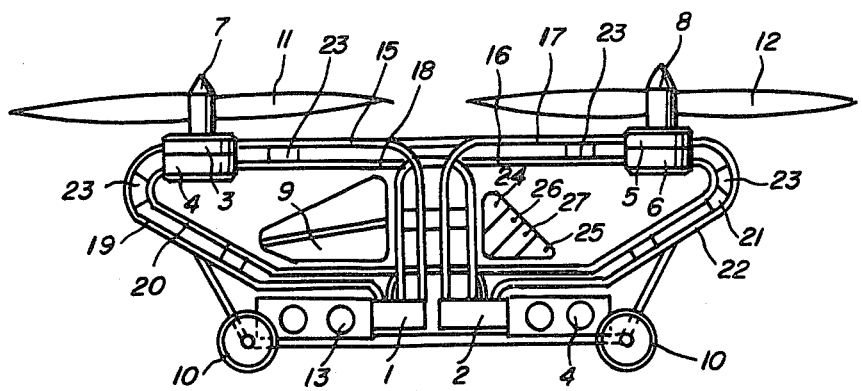
FIG. 1 is a lateral elevational view of a vehicle in accordance with the invention.
Figure 2:
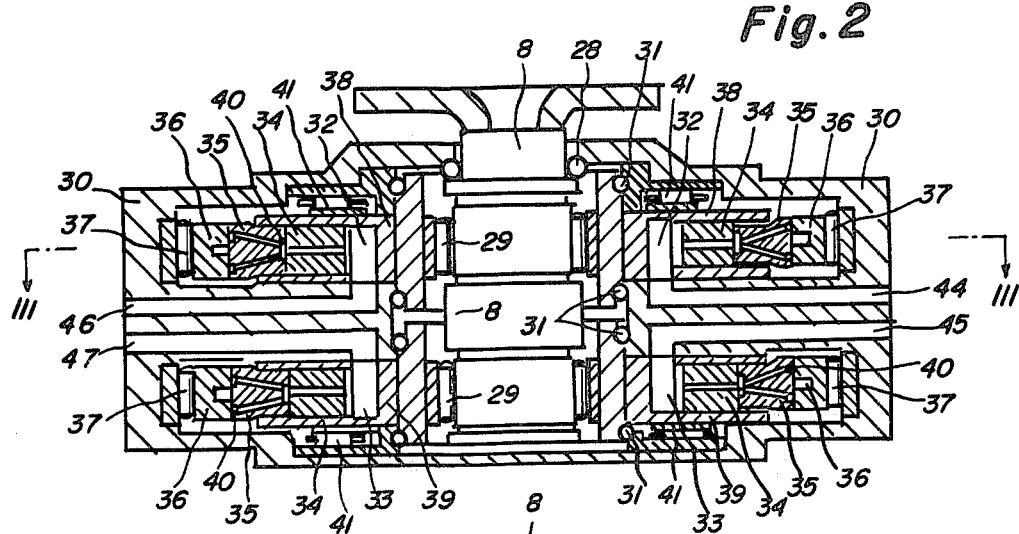
FIG. 2 is a longitudinal sectional view of a rotary hydraulic motor for driving the propellers of a vehicle in accordance with the invention, comprising two rotors coupled to a common shaft for unidirectional rotation.
Figure 3:
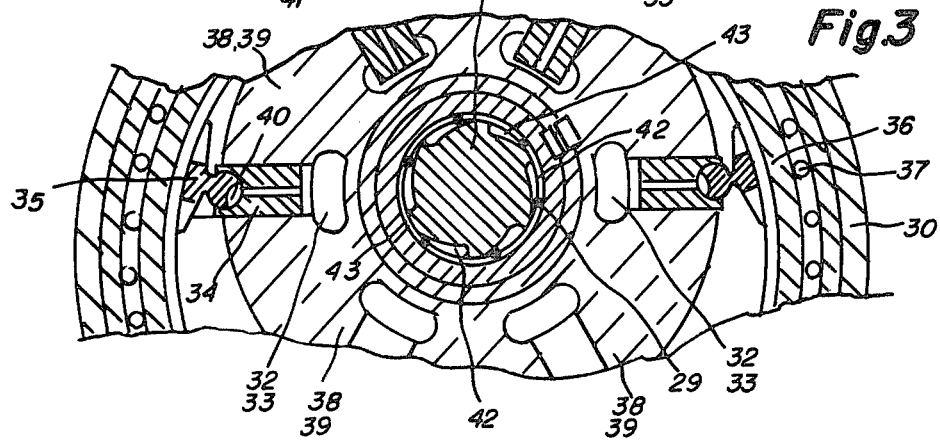
FIG. 3 is an axial sectional view taken along the line III—III of FIG. 2.

Referring to the drawings in particular, the invention embodied therein, as shown in FIG. 1, comprises a combined vehicle for traveling in the air and rolling on the ground. In accordance with the invention, the vehicle includes a body structure including the pilot's cabin 9 and an undercarriage including wheels 10. The driving system comprises driving engines 13 and 14, such as internal combustion engines, gas turbines, or the like, hydraulic pumps 1 and 2, hydraulic conduits 15-22, two rotary hydraulic motors which include rotors 3 and 4, and 5 and 6, respectively, driving shafts 7 and 8, in propellers 11 and 12. The hydraulic pumps furnish each two separated pressure fluid flows, whose rates of flow are equal or in a fixed proportion, to each other. Wheels 10 may also be driven by hydraulic motors and switching valves may be provided for alternately connecting the hydraulic circuits to the wheels. The cabin 9 may also receive passengers or cargo. Fuel tanks 26 and 27 are provided, and tanks 24 and 25 are provided for the hydraulic fluid. Advantageously, one tank of hydraulic fluid is provided for at most one or two hydraulic circuits, so that in case of failure of one of the tanks or rupture of one of the lines, only one circuit is interrupted and the other circuit or circuits can still be supplied from their associated fluid tanks. Shafts 7, 8 are parts of the motors 3,4 or 5,6. The construction of the hydraulic motors is illustrated in FIGS. 2 and 3. As for the circuits, the first pressure fluid flow passes from pump 1 through an uninterrupted pressure fluid line 15 to and through the rotor 3 of motor 3, 4 and through a return line 19 back to the pump 1. The second pressure-fluid flow of the hydraulic pump 1 passes through an uninterrupted pressure fluid line 16 to and through the rotor 6 of hydraulic motor 5, 6 and through a return line 21 back to the pump 1. For pump 2, the first pressure fluid flow passes through an uninterrupted pressure fluid line 17 to and through rotor 5 of the hydraulic motor 4, 6 and through a return line 22 back to the pump 2. The second pressure fluid flow of hydraulic pump 2 passes through an uninterrupted pressure fluid line 18 to and through rotor 4 of hydraulic motor 3, 4 and through a return line 20 back to the pump 2. Supporting ribs 23 may be provided between the individual pressure fluid lines.

Owing to the arrangement, according to FIG. 1, even if one of the driving engines 13 or 14 fails, hydraulic motors 3,4 and 5, 6 and thereby, the propellers 11 and 12, continue to be driven by the other engine and pump and by the hydraulic motors associated therewith. Also, in case of failure of one of the rotors in the hydraulic motors, the other rotor continues to rotate because the stopped rotor disengages from the propeller driving shaft 7 or 8 due to the coupling, illustrated in FIGS. 2 and 3. The reliability in operation obtained by the described arrangement in accordance with the invention, is also applied to the other embodiments of the invention, only the description of the system is not repeated in the text hereinafter. However, all of the systems used in other embodiments are derived from this basic system illustrated in FIG. 1 and designed analogously.

Referring to FIGS. 2 and 3, the pressure fluid operated motor, in accordance with the invention shown therein, is a rotary motor of the radial-piston type which comprises, a common housing 30, a driver shaft 8 and two rotors 38 and 29 coupled thereto. Each of the rotors 38 and 39 is rotatably mounted in bearings 31 and is formed with working chambers or cylinders 32, 33 cooperating with displacers or pistons 34. Pistons 34 are operatively connected to guide members, such as piston shoes 35, through which they slide on and apply against guiding surfaces, for example, rotary reaction rings 36. The eccentricity of rotors 38 and 39 in respect to the reaction rings 36 imparts a rotary motion to the respective rotor 38 or 39, in synchronism with the feeding of the pressure fluid through the inlet passages 46 and 47 or 44 and 45 to the cylinders 32 and 33. Reaction rings 36 may be mounted rotatably in bearings 37 in a well-known manner. Rotors 38 and 39 may be held in their axial position by bearings 41 provided at the axially outer sides. Between the pistons and their shoes, hydrostatic bearings 40 may be provided which is also known in the art. Up to these features, the motor is a well-known radial-piston machine which, however, is designed with two rotors in tandem and, therefore, provided with double inlet and outlet passages for the pressure fluid separated from each other. In the present embodiment, these inlet and outlet passages are disposed in a new manner and thrust bearings 41 are aligned with the respective axial pressure components, the bearings 41 on the respective one of the rotor sides being associated with the fluid passages or ports 44, 46 and bearings 41 on the other rotor side being associated with the passages or ports 45, 47 of the pressure fluid. Thus, the particular features of this motor are that the two rotors can be subjected to the fluid pressure separately and can rotate independently from each other. In addition, the two coaxial rotors are hollow and cooperating with the common shaft 8. Between the common shaft and each of the rotors 38 and 39, a freewheel coupling, effective in one direction of rotation, is provided which comprises rollers or balls 29 and clamping surfaces 42 which are regularly distributed over the circumference of the respective portion of shaft 8 and cooperate with the opposite bore surface 43 of the rotor. The surfaces 42 are inclined in the circumferential direction with respect to the surface 43 so that narrow converging interspaces are formed therebetween in which the individual rollers or balls are placed. As soon as pressure fluid is supplied to the rotors 38 and 39, both rotors are rotated, for example clockwise, in considering FIG. 3. Thereby, the rollers or balls 29 are entrained by the rotating surface 43, toward the narrow part of the interspaces and wedged between the surface 43 and the respective one of the inclined clamping surfaces 42 of the common shaft 8 so that shaft 8 and the respective rotor 38 and 39 are firmly coupled to each other in the one direction of rotation. Consequently, both rotors 38 and 39 drive the common shaft 8, and their power output is transmitted to any working member connected to shaft 8.

In case one of the rotors 38 or 39 is stopped, for example because of a fracture or jam of one of its component parts, shaft 8 continues to be driven by the other non defective rotor 38 or 39, the rollers or balls 29 associated with the stopped rotor rolling back on the now alone or faster revolving clamping surfaces 42 and being carried along into the widest portion of the respective interspaces between the surfaces 42 and 43. Thereby, the stopped or decelerated rotor is disengaged from shaft 8, and the other rotor 38 or 39 can continue undisturbed rotating and driving of the shaft 8, and a jerky braking of the working members, wheels, propellers or the like, fixed to shaft 8 upon failure of one of the hydraulic motors is thus prevented. More particularly, crashing of the aircraft caused by a motor getting hot or stuck is thereby avoided.

Moreover, within the scope of the invention, the coupling 29, 42, 43 which in the embodiment shown comes into effect automatically in any case is of importance in still another direction; namely, such a coupling 29, 42, 43 may be provided between one of the rotors 38 or 39 and the shaft 8 while the other rotor is rigidly fixed to the shaft. Thereby, it can be obtained that during a desired period, both rotors 38 and 39 drive the shaft, and during another period, only the rotor rigidly fixed to the shaft 8 is driving while the other rotor is completely disengaged and practically in non-frictional contact with the shaft. This permits producing either a drive with a high torque when both rotors 38 and 39 are acting on shaft 8, or a high-speed drive with a small frictional resistance when one of the motors 38 or 39 is disengaged from shaft 8 due to the effected uncoupling. The rotor rigidly connected to the shaft 8 assures the drive of the latter in both directions.

As shown in FIG. 1, the vehicle can also run on a highway. To this end, the motors 3 to 6 or the shafts 7 or 8 are adapted to be connected to wheels 10. In such a case, if it is desired to run on the ground with a high torque, i.e., with a high tractive force, the pressure fluid is supplied from a common line or from parallel lines conducting two pressure fluid flows into both rotors 38 and 39 so that, in a joint action of the two rotors, the highest torque is produced. On the other hand, if desired to run fast on a highway which requires a smaller torque, all the pressure fluid previously supplied into the two rotors 38 and 39 is directed into only one of these rotors 38 or 39 for example into the rotor which is rigidly connected to the shaft. Being now supplied with a double volume of pressure fluid, the motor rotates at a correspondingly higher speed. In this manner, the energy of the hydraulic motors connected in series or idling along, which would otherwise be lost, is saved.

There is thus provided a motor which is particularly suited for operating without interruption even if one of its rotors becomes defective, so that aircraft crashes can be prevented, or which may either produce an increased torque by means of two rotors, or should the torque of the other rotor be unnecessary or undesirable, may use only one rotor for driving without having to overcome the friction of two rotors.

Figure 4:
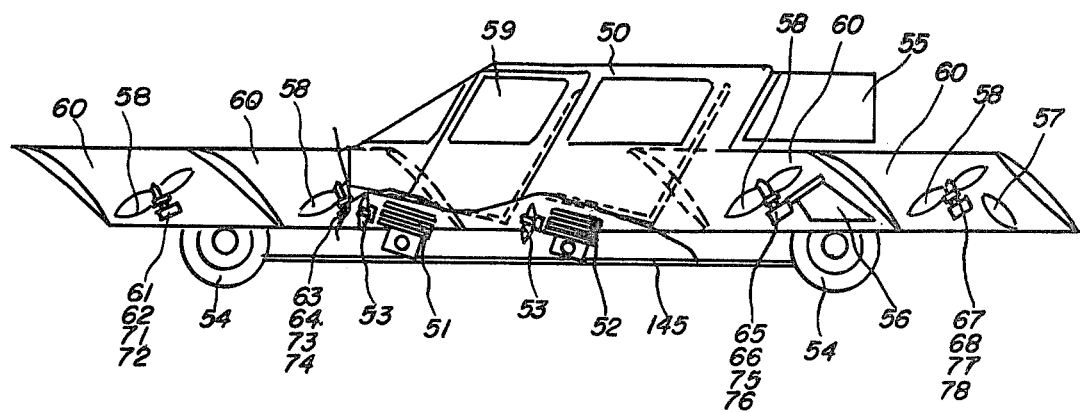
FIG. 4 is a lateral elevational view of another embodiment of a vehicle in accordance with the invention, partly in section, along the line IV—IV of FIG. 5.
Figure 5:
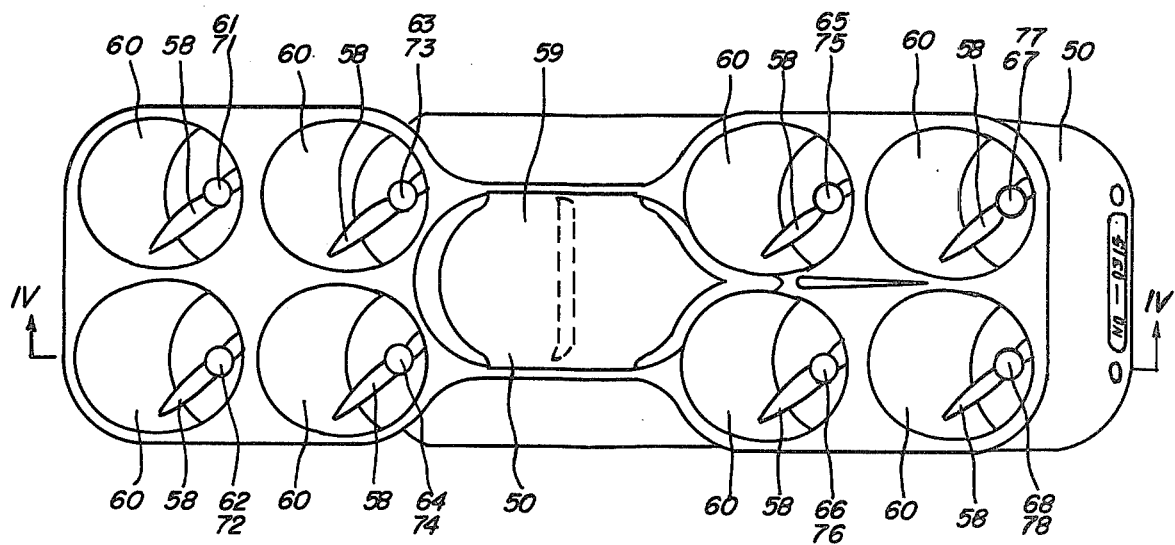
FIG. 5 is a top plan view of the vehicle illustrated in FIG. 4.

In the embodiment of the invention shown in FIGS. 4 and 5, annular air ducts are provided for receiving the propellers and the hydraulic motors. The mounting of propellers in ducts or annular wings or shrouds is known in itself and is frequently used. The particularly of the embodiment shown consists in that the annular ducts surrounding the propellers are given an inclined orientation and airfoil section in the flight direction and, moreover, the ducts are disposed so as not to project beyond the horizontal or vertical clearance limits allowed by the road traffic regulations. To obtain the necessary reliability in operation, the propeller driving motors are designed in accordance with the principle illustrated in FIGS. 2 and 3, and are driven by separate parallel pressure fluid circuits having mutually equal rates of flow as described in connection with FIG. 1. The vehicle body 50 may be pressed or molded along with the propeller ducts 60 in one piece, the propellers 58 received in the ducts 60 being driven by hydraulic motors comprising the rotors 61–68 and 71–78. As far as admissible from the standpoint of security, single rotor motors may also be used in place of those with two rotors. If hydraulic pumps, each producing two fluid flows, are provided, motors located on the vehicle, in diametrically opposed locations, are connected in the two circuits of a single pump, for example 61 and 68, 62 and 67, 63 and 66, and 64 and 65, or the corresponding rotors beginning with the numeral 7. If pumps are provided, each producing four fluid flows, the rotors 61, 62, 67, 68 are driven by the first, the rotors 63, 64, 65, 66 by the second, the rotors 71, 72, 77, 78 by the third, and the rotors 73, 74, 75 and 76 by the fourth flow. Reference numeral 59 designates the pilot's and passenger cabin, and 51, 52 are the driving engines which, should the air stream produced by the motion of the vehicle be insufficient, for example during the start, landing, vertical flight or running on the road, are cooled by fans 53. To comply with road traffic regulations, the width of the vehicle is slightly below 2.5 meters and the propellers have a diameter of approximately one meter. There are provided members for controlling the yawing motion 56, the inclination to the horizontal plane 57, and the horizontal motion 55. The large number of eight propellers 50 and corresponding ducts 60, as well as hydraulic motors and circuits, is provided in order to take in enough air for the vertical flight while efficiently reducing the power to be generated. Since propellers are very inefficient in a vertical start and landing and consequently require a very high power supply, vehicles designed in accordance with the present invention, insofar as they are reduced to a width of 2.5 meters for road traffic, require correspondingly higher driving powers as compared to helicopters having large propeller diameters.

Vehicles shown in FIGS. 12 to 16, which are equipped with only four propellers and shrouds require, for example, a driving power of approximately 600 to 1200 HP, as land-air vehicles for four persons, according to the desired travel spped. On the contrary, in vehicles shown in FIGS. 4, 5, 11, 17 and 18, each having eight shrouded propellers of approximately one meter in diameter, a great quantity of air is taken in and the efficiency of the vertical flight is increased. Accordingly, the vehicles equipped with 8 shrouded propellers can manage with a substantially lower driving power. For example, the eight-propeller vehicles, in accordance with the invention, require only a total of approximately 300 to 500 HP as a driving power for a crew of four persons. This is provided, of course, that the hydraulic multiple-flow pumps and the propeller driving hydraulic motors are sufficiently efficient, which can be assured by using pumps and motors or internal combustion engines furnishing hydraulic fluid, in accordance with the corresponding patents of the inventor, and by providing lightweight constructions of the motors and pumps, also in accordance with the patents of the inventor. The propellers disposed on the lefthand side of the longitudinal axis of the vehicle in the travel direction are provided as rotating in the opposite direction with respect to those disposed on the righthand side. This measure is equally applied to all of the vehicles represented in the other figures.

Figure 6:
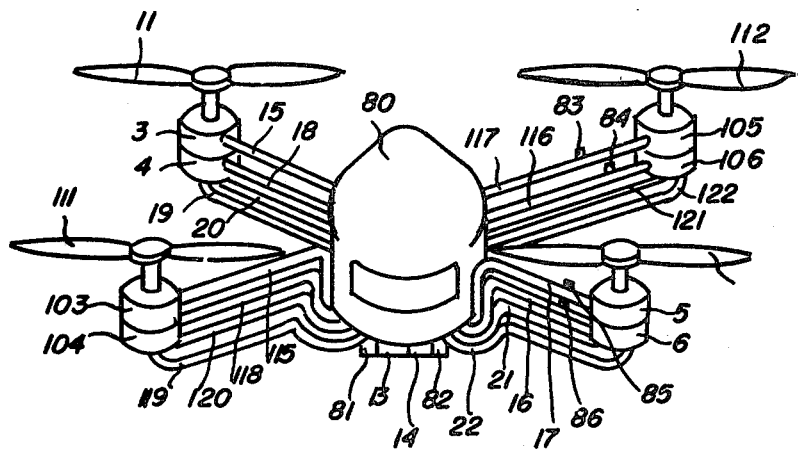
FIG. 6 is an perspective view of another vehicle designed in accordance with the invention.
Figure 7:
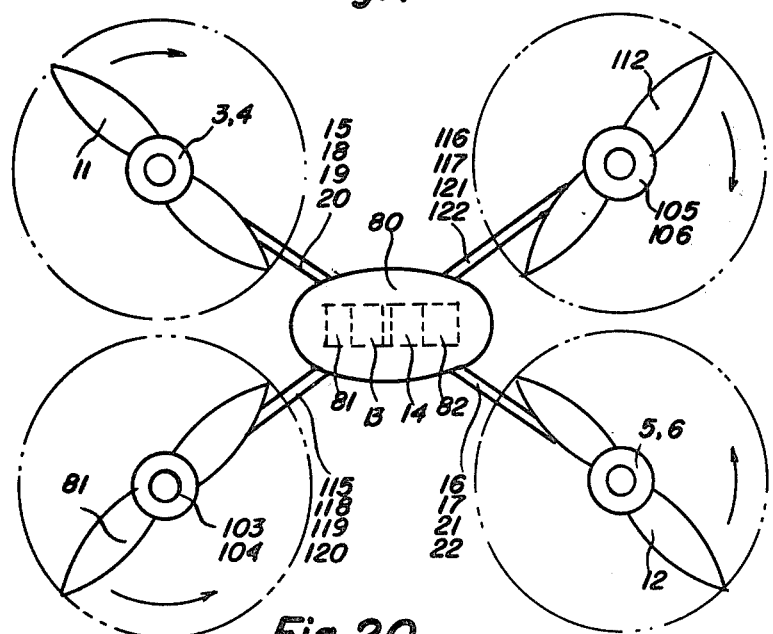
FIG. 7 is a top plan view of the vehicle shown in FIG. 6.
Figures 10, 20:
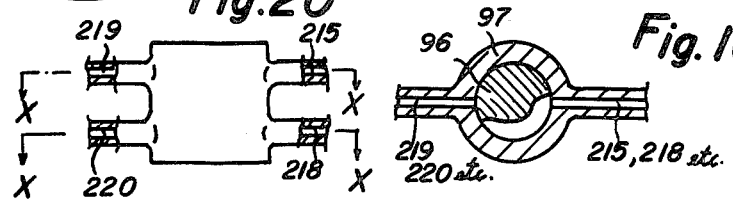
FIG. 10 is a lateral elevational view, partly in section, of a double bypass member in accordance with the invention, serving to control the flow rates in two parallel pressure fluid circuits.
FIG. 20 is a view upon a double bypass flow control means of the invention for the bypass flow control of a double flow system of the invention with partially sectional views therethrough.

FIGS. 6 and 7 show a particularly reliable and inexpensive vehicle capable of flying in any horizontal and vertical direction while controlled in a simple manner and operating in accordance with the teachings of the present invention. On the bottom of the vehicle body 80, the driving engines 13 and 14 and the pressure fluid pumps 81 and 82 are mounted producing four pressure fluid flows with rates of flow in a fixed proportion to each other. The pressure fluid pumps are preferably designed in accordance with the embodiments shown in FIGS. 8, 9 or 19. The propellers 11, 12 and 111, 112 have a diameter of approximately 1.8 to 3.6 meters and consequently may have a constant angle of incidence and be made of wood, light metal or plastics in a one-piece construction. The vehicle may carry three to four persons. The supply system of FIG. 1 is used in this case in an analogous arrangement. Four-flow pumps are provided instead of two-flow pumps. For a load of four persons, the driving engines must produce approximately 120 to 240 HP per engine, and at least two driving engines are necessary, each driving a four-flow pump. One hydraulic circuit of the four-flow pump 81 drives the propeller 11 through lines 15, 19 and the hydraulic rotor 3, another drives propeller 12 through lines 17, 22 and the hydraulic rotor 5, still another circuit drives the propeller 111 through lines 115, 119 and the hydraulic rotoer 103, and the remaining circuit drives the propeller 112 through lines 117, 122 and hydraulic rotor 105. In connection with the second pressure fluid pump, i.e., the four-flow pump 82, the first circuit drives the propeller 11 through lines 18, 20 and hydraulic rotor 4, the second drives propeller 12 through lines 16, 21 and hydraulic rotor 6, the third circuit drives propeller 111 through lines 118, 120 and hydraulic rotor 104, and the last circuit drives propeller 112 through lines 116, 121 and the hydraulic rotor 106. Should one of the driving units fail, the other continues to drive all four of the propellers, and the vehicle may make a safe landing. Should one of the hydraulic rotors fail, the other rotor of the motor continues to drive the propeller and the stopped rotor disengages automatically due to the coupling provided between the same and the propeller shaft 8. For adjusting the inclination of the vehicle to the horizontal plane and thereby determining the speed and direction of the flight, connections 83, 84 and 85, 86 may be provided, for example, on the supply lines 116, 117 and 16, 17, respectively, connected to the associated return lines 121, 122 and 21, 22 by lines shortcircuiting to a small extent the respective rotors. A flow volume regulator may be mounted in each of these bypass lines or a bypass member 100 with a turning slide valve 96 common for two of such bypass lines, as shown in FIGS. 10 and 10a, may be connected therein. The cross-section of the connections 83 to 86 and of the flow regulator of FIG. 10a, as well as of the respective outlets and inlets 215 to 220, must be very small since only very small portions of the motor driving fluid can be permitted to pass through the bypass lines in order to prevent any excessive change of the motor speeds and thereby any excessive inclination of the vehicle endangering its stable position in the air. The bypass member and regulator, according to FIGS. 10 and 10a comprises a casing 97 and an operating valve 96. The bypass circuits for producing the inclination of the vehicles are established, for example, by connecting inlet 215 to the point 83, inlet 218 to the point 85, outlet 219 to the return line 121 and outlet 220 to the return line 21. By turning the operating valve 96, a greater or smaller quantity of pressure fluid which is in any case small relative to the main flow, is permitted to escape from two supply lines into the return lines with the effect that during the escape, the respective propeller driving motor turns at a slightly lower speed as compared to the other motors which are not controlled in this manner. Consequently, the vehicle becomes slightly inclined to the side of the slower rotating propellers and moves in this direction. Instead of associating the flow regulator 96, 97 with lines 116, 117 or 16, 17, the device may also be connected to other lines thereby reducing the speed of other motors and propellers. If, for example, inlet 215 is connected to the point 85 and inlet 218 to point 86, and outlets 219, 220 are connected to return lines 21, 22, motor 5, 6 and propeller 12 are connected in the inclination control circuit.

The indicated propeller diameters represent a particularly expedient, simple and reliable solution because, with such dimensions, gusts of wind and speed differences between the forward and backward motion of the propeller blades can still be absorbed by the shafts 8 of the hydraulic motors and shocks to which the aircraft is exposed due to the air velocity differences at the propeller blades do not yet cause too intense vibrations.

Figure 8:
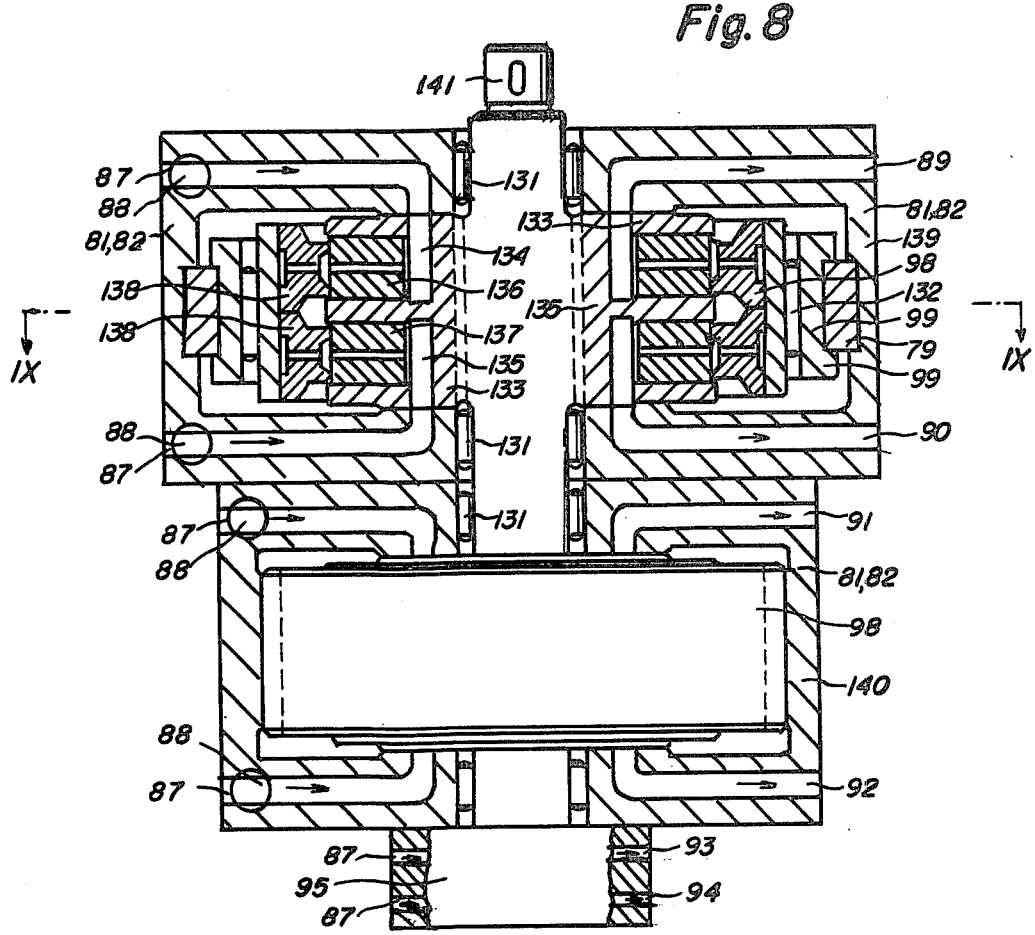
FIG. 8 is a longitudinal sectional view of four separate flows producing pressure fluid pump for driving the hydraulic motors in accordance with the invention.
Figure 9:
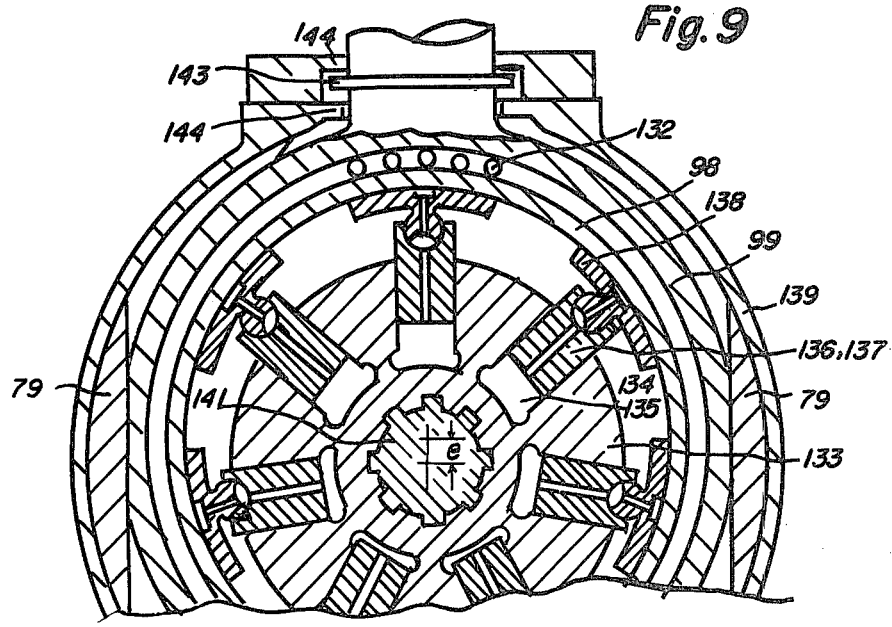
FIG. 9 is an axial sectional view taken along the line IX—IX of FIG. 8.

In FIGS. 8 and 9, a pump which produces four fluid flows is represented, which may advantageously be used in vehicles designed in accordance with the invention. The unit comprises two two-flow pumps mounted axially in tandem on a common shaft of which one is controllable within certain limits as to its delivery so that two and two of the produced flows have rates of flows which are equal or in a fixed proportion to each other. The housings 139 and 140 are flanged to each other, and the shaft 141 carrying the rotors is rotatably mounted in bearings 131 provided in both of the housings. Each of the housings encloses one rotor 133, and each rotor 133 is formed with two groups of delivery chambers or cylinders 134 and 135 in which pistons 136 and 137 are reciprocated by means of a reaction ring 98 with interposed piston shoes 138. A stroke adjusting slide block 99 surrounding the reaction ring 98 with an interposed bearing 132 is displaceable, within certain limits, along guides 79 whereby the stroke of the pistons may be varied to a limited extent. The groups of cylinders 134 and 135 are completely separated from each other, and each group has its own fluid inlet passage 87 and fluid outlet passage 89 to 92, respectively. The pressure fluid inlet and outlet passages cannot communicate with each other. Flow volume regulators 88 may be mounted in the inlet passages in case that the stroke adjusting slide block 79, 99 is not provided. The other housing 140 encloses the same members, i.e., the rotor block with groups of cylinders, pistons, piston shoes, and only the reaction ring 98 is not adjustable. In the figure, this reaction ring 98 is shown in an elevational view. The part mounted in the housing 140 has its own inlet passages 87, if necessary, with flow regulators 88 mounted therein and two mutually separated and non-communicating fluid outlet passages 91 and 92. A priming device 95 having inlets 87 and two separate outlets 93 and 94 may be provided at the end of the pump. In this case, the outlets 93 and 94 lead to the inlets of the main pump. The outlet passages 89, 90, 91 and 92 are connected each to one of the hydraulic motors of the vehicle through pressure fluid lines. Owing to this arrangement, a fixed proportionality, in particular equality, of the rates of flow in all of the four circuits is assured, with two of the flows being jointly adjustable.

Figure 11:
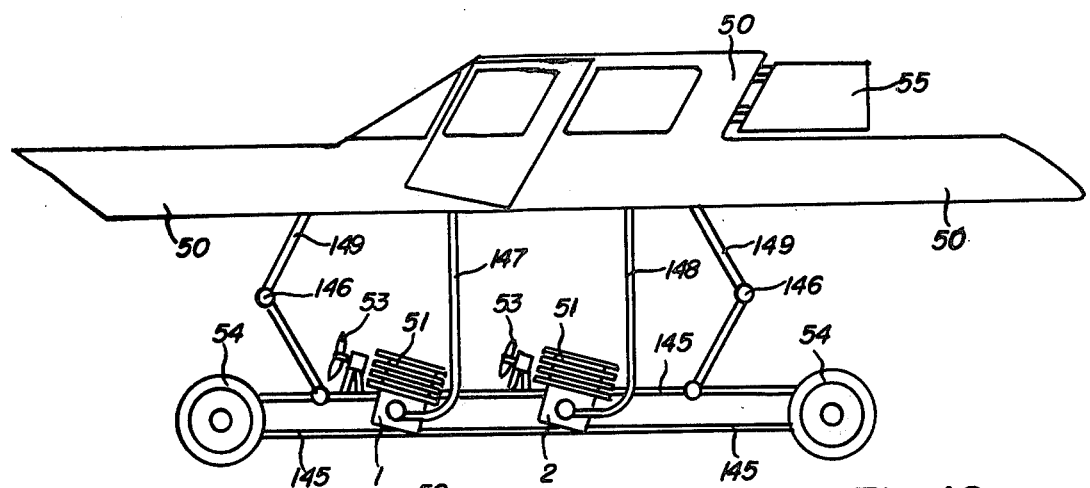
FIG. 11 is a lateral elevational view of another embodiment of a vehicle in accordance with the invention.
Figure 16:
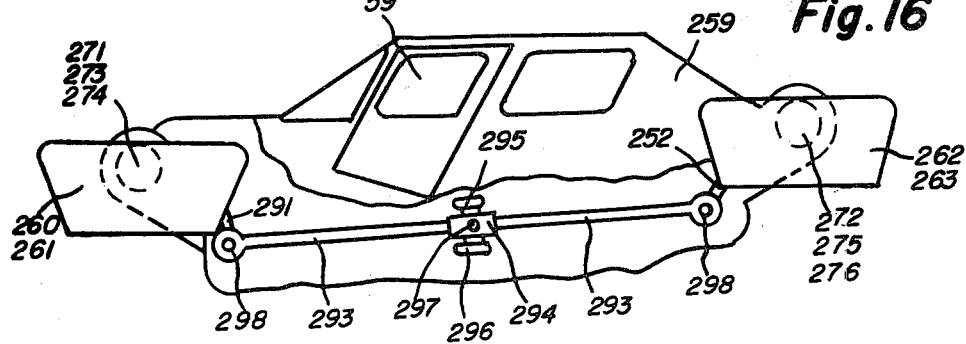
FIG. 16 is a lateral elevational view showing an adjusting mechanism in a vehicle according to the invention, such as illustrated in FIG. 12.

FIG. 11 shows an embodiment of the invention similar to that of FIGS. 4, 5 or 12-16, in which a flight-stabilizing arrangement is provided. The shrouded propellers, their driving engines 51, and the hydraulic pumps 1 and 2 associated therewith, are normally concealed in the vehicle body 50 which is provided with a rudder 55. The entire driving mechanism has a considerable weight, and can therefore be used for the stabilization of the vehicle, i.e., the displacement of its center of gravity. In the present embodiment, this is effected by locating this whole mechanism on an undercarriage 145 which is made vertically lowerable and retractable and also carries the wheels 54. The pressure fluid lines 147, 148 are flexible or foldable. The undercarriage 145 is connected to the vehicle body 50 by means of a lifting and lowering lever mechanism 146, 149. While running on the road, the vehicle body 50 reposes on the undercarriage 145 by its own weight. While taking off into the air, the undercarriage carrying the heavy parts of the driving mechanism sinks down under its own weight and as long as the vehicle remains in the air, the mass of the parts 1, 2, 51, 53, etc., is placed far below the body 50. The center of gravity of the vehicle is thereby situated very low and the flight position is considerably stabilized.

In the embodiment of FIGS. 12 to 16 which may analogously be applied also to other embodiments of the invention, the propellers are enclosed in shroud members 260-263 which are hinged by means of bolts at 271-276 to trifurcated extension arms of body 259 and, thereby, made orientable in the flight direction. The hydraulic motors with the propellers are mounted within the shrouds and each produce an air jet. These jets may be oriented with the aid of the shrouds in all directions, in particular, forwardly, backwardly or downwardly, so that the vehicle may move up vertically, touch down vertically, move forward or backward, or brake its movement in the air. The mechanism for the orientation is actuated from the pilot's cabin 59. A connecting mechanism, comprising rods 293, joints 298, levers 291, 252 and joint members 294-297 is provided assuring a simultaneous pivotal movement of the shrouds. Naturally, any other appropriate mechanism assuring a synchronous orientation of the shrouds may be provided instead of the mechanism shown in the figures.

Figure 12:
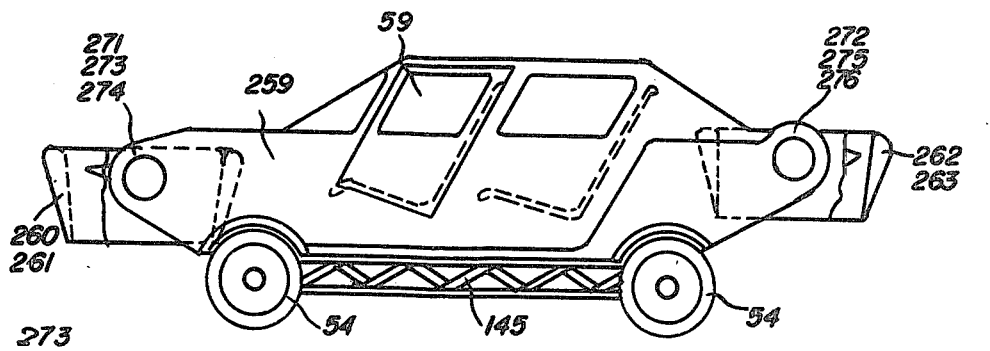
FIG. 12 is a lateral elevational view of still another embodiment of the invention.
Figure 13:
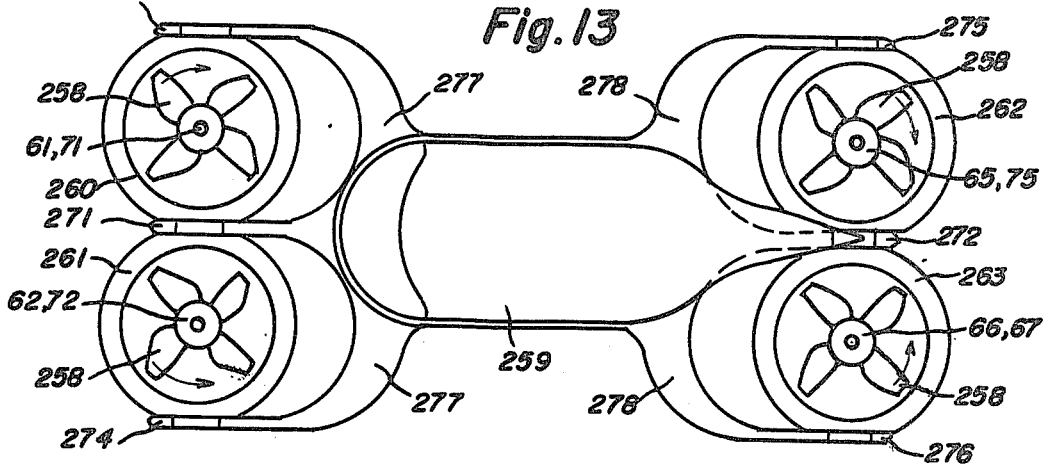
FIG. 13 is a top plan view of the vehicle of FIG. 12.
Figure 14:
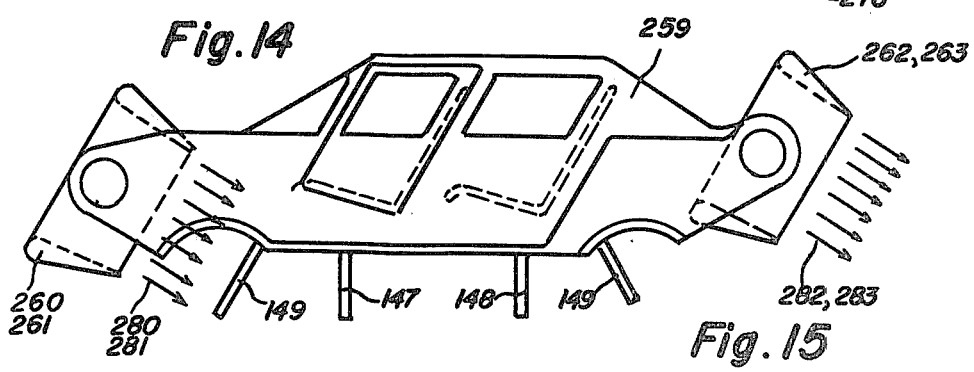
FIG. 14 is a partial elevational view of the vehicle of FIG. 12 showing the position during a forwardly directed lift.
Figure 15:
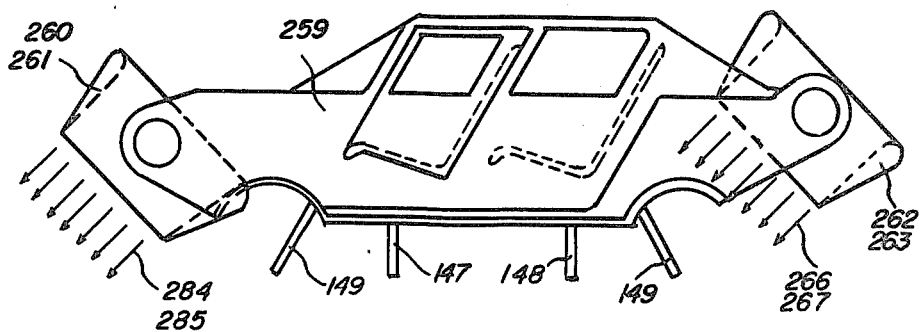
FIG. 15 is a partial elevational view of the vehicle of FIG. 12 showing the position during the braking in the air before the intended alighting on a highway or on the ground.

The vehicle represented in FIGS. 12 to 16 is a particularly short vehicle which may be used as a fully operational and reliable combined air-road vehicle nevertheless. While running on a road, the vehicle body 259 with the cabin 59 reposes by its own weight on the lowerable undercarriage 145 supported by wheels 54. Special locking means for the travel on roads may be provided. When taking off into the air, the undercarriage 145 sinks below the body 259 and, owing to its own weight, remains in this position in which it may also be locked. The propeller shroud members are suspended from a supporting structure 276-278 which projects from the body 259 to both sides, and comprises six arms 271 to 276, as may particularly be seen in FIGS. 12 and 13. These figures also show the hydraulic motors, including each two rotors 61 to 65 and 71 to 75 as well as the propellers 258 and their direction of rotation which, however, may be inverted. FIG. 12 shows the propeller shrouds in a position for vertical ascent; FIG. 14 shows the same shrouds in a position for forward flight, and FIG. 15 shows a position for braking or backward flight.

The length of the vehicle of FIGS. 12 to 16 is between 3 and 5 m, which corresponds to the length of conventional automobiles, and the width of the vehicle is about 2.50 m or less in order to be admitted on highways. In view of the limited width given by the road traffic regulations, the propeller cannot have a larger diameter than approximately 1 meter. Such propellers have a relatively low efficiency and a very small lifting power, if small driving powers are considered. In consequence, for a load of four persons, the vehicle requires approximately 1200 HP of driving power, according to the desired speed of flight. This power is generated by two driving engines, each engine driving a four-flow pump which is designed in accordance with the invention. Each fluid flow of one of the pumps drives one of the rotors of the hydraulic motors associated with the propellers and the fluid flows of the other pump drive, each the other rotor of the respective hydraulic motor. If only one or two persons, and thus a smaller weight is considered, a correspondingly smaller driving power may be provided. In addition, in accordance with the invention, instead of two driving engines and two four-flow pumps, another number may be provided is the interconnection of the pressure fluid lines is adapted thereto.

The power capacity to be installed in a vehicle as shown in FIGS. 12 to 16 is relatively high and the fuel consumption is accordingly higher. Therefore, it is desirable to design an operative air-land vehicle requiring less driving power. The difficulty is that for being admitted on the road, the vehicle must not be wider than about 2.50 m. Thus, in vehicles according to FIGS. 12 to 16, there is no space available for providing propellers with a larger diameter which would permit obtaining a higher helicopter-like efficiency and which would reduce the necessary driving power.

Figure 17:
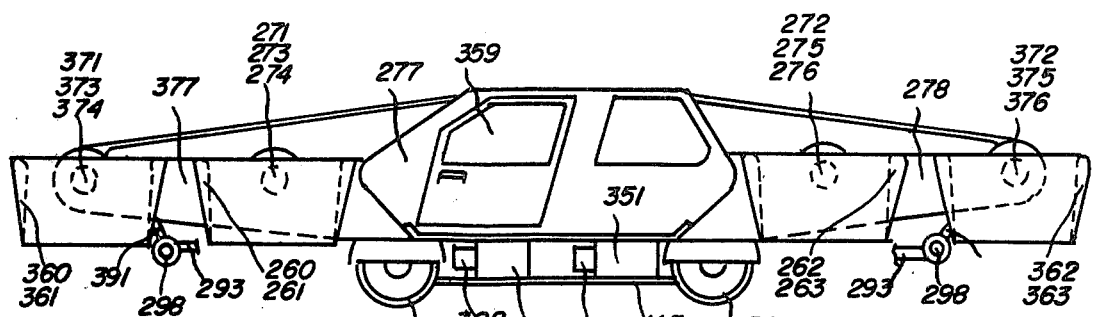
FIG. 17 is a lateral elevetional view of another embodiment of a vehicle in accordance with the invention.
Figure 18:
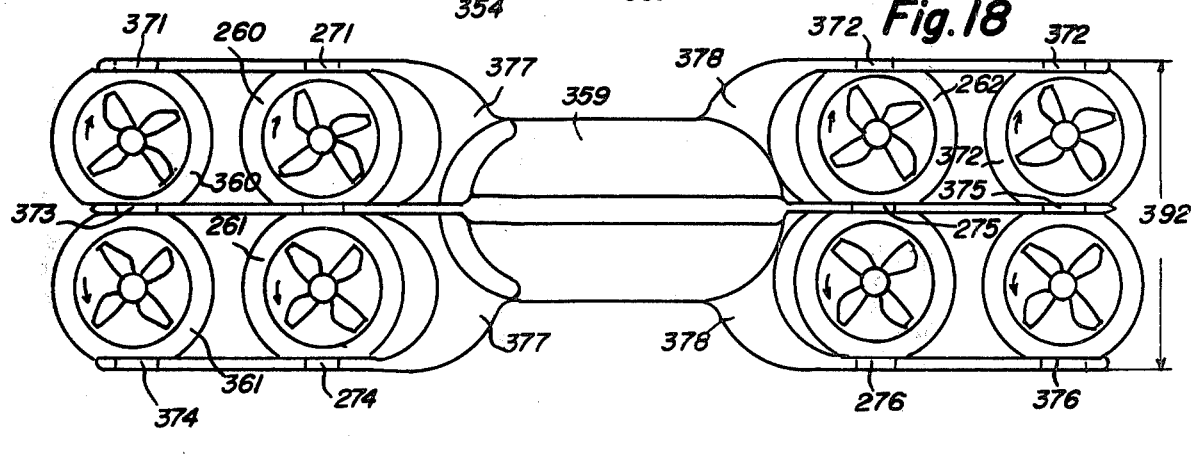
FIG. 18 is a top plan view of the vehicle of FIG. 17.

This problem is solved by the embodiment according to FIGS. 17 and 18. In this embodiment, instead of providing two shrouded propellers in front of and two behind the cabin 359, four shrouded propellers are provided ahead and four in the rear. The propellers and shrouds are of the same size as seen in FIGS. 12 to 16 without requiring a larger width of the vehicle. Consequently, the vehicle can be admitted on highways, the more so, since the propellers are shrouded and cannot hurt anybody. By doubling the number of shrouded propellers, the air volume taken in by the propellers is also doubled so that the individual propellers can work under smaller load and with higher efficiency. Thus, vehicles in accordance with FIGS. 17 and 18 require a substantially smaller driving power for the same carrying capacity. For example, two Porsche six-cylinder 210 HP-motors of the known Porsche automobile type are sufficient to drive two four-flow pumps shown in FIG. 19 so as to make an operable vehicle for four persons of the kind represented in FIGS. 17 and 18, both on the road and in the air. According to the desired driving power, 300 to 600 HP may be installed in this vehicle. The vehicle body 277 comprises a cabin 359 and wheels 54, and the driving engines 351 and four-flow pumps 302, 303 are mounted on the undercarriage 145. The supporting arms 377 and 378 extend from the central part of the vehicle to both sides, one in the forward and one in the backward direction, and their end portions are provided with means for mounting the orientable shrouded propellers, for example, with joint bolts 271 to 276 and 371 to 376 for the shrouds 260 to 263 and 360 to 363, respectively. The actuating mechanism for the synchronous orientation of all of the shrouds are indicated at 293, 393, 391 and 298.

The four fluid flows of the one four-flow pump drive the motors in inner shrouds 260 to 263 and are correspondingly connected through pressure fluid lines. The four fluid flows of the other four-flow pump drive the motors in the outer shrouds 360 to 363. Should the inner driving system fail, the outer system continues to operate and inversely so that even if a half of the drive fails, the remaining motors are sufficient to make a safe landing. The speeds of the propellers in all of the inner shrouds 260 to 263 are mutually synchronized by the four-flow pump supplying separate fluid flows having mutually equal rates of flow. The propellers in the outer shrouds 360 to 363 are analogously synchronized by the separate fluid flows of the other four-flow pump. The propellers disposed to the left and to the righthand side in the travel directiion of the vehicle are rotated in mutually inverse directions which is easily obtainable by inverting the connections of the hydraulic motors. Four four-flow pumps are provided with propellers driven by hydraulic motors, each having two rotors, as described hereinbefore. The advantages and features of the other figures might be combined, if desired, with those of FIGS. 17 and 18.

By the arrangement of parallel connection of hydraulic motors in mutually non-communicating separate hydraulic circuits supplied by pumps, each of which produces two or four proportional fluid flows, the losses usually found up to date in series connections of hydraulic motors are avoided. As has been found in the meantime, in a hydraulic motor designed in accordance with the inventor's U.S. Pat. No. 3,211,399 and connected in series ahead, these losses amount to from 4 to 8% as compared to the motor series connected behind.

Figure 19:
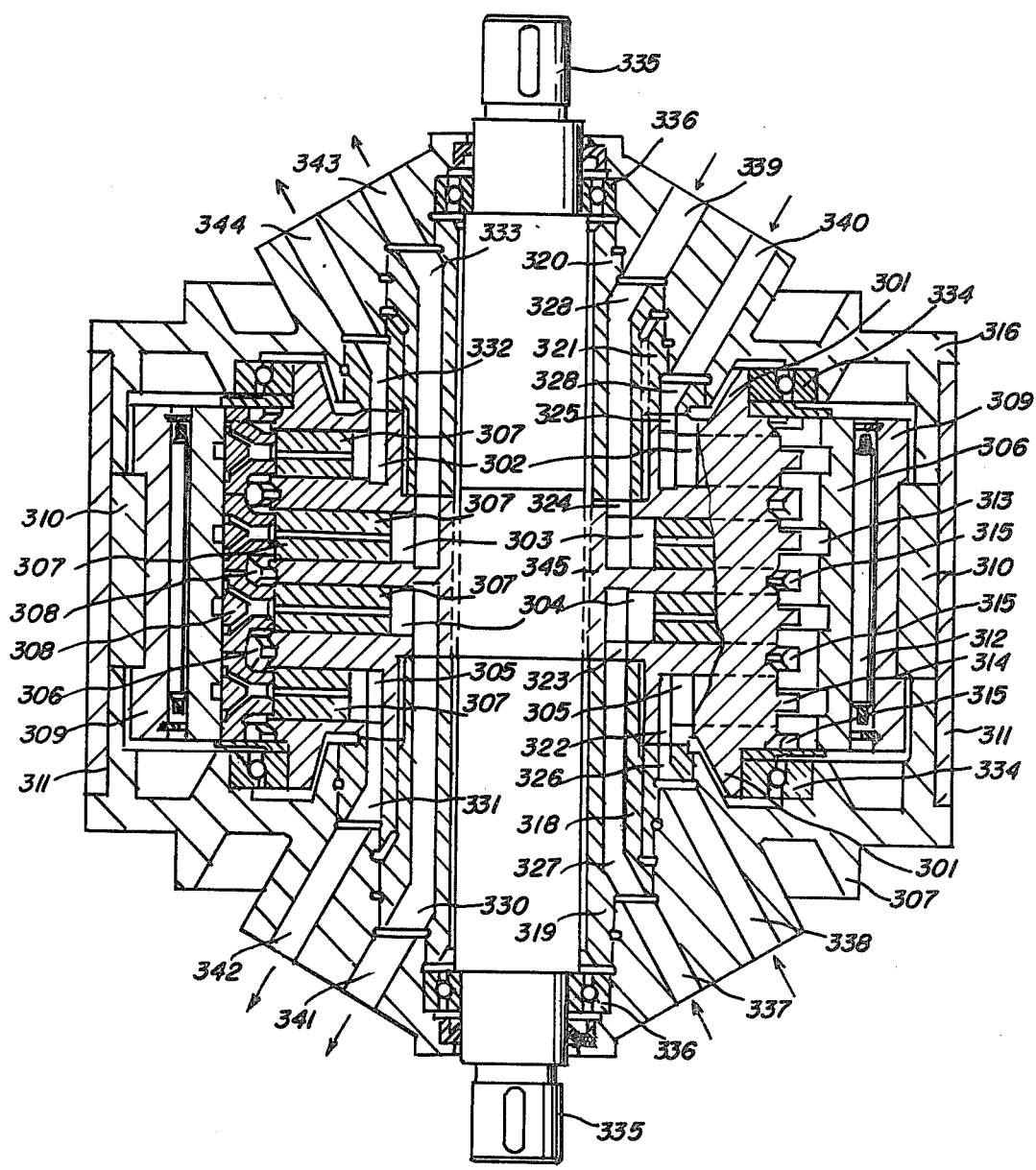
FIG. 19 is a longitudinal sectional view taken perpendicularly to the eccentricity adjustment plane of a multiple flow pump, in accordance with an application in the invention.

FIG. 19 shows a high-pressure fluid operated pump for producing four separate fluid flows which, in view of its tightness and reliability in operation, is particularly suitable for the driving of hydraulic motors used in the vehicles in accordance with the invention. In this pump, the rotor comprising the delivery chambers or cylinders is flowed through axially from and to both sides. In particular embodiments, instead of four fluid flows, six, eight or another number, for example, three, five or seven, may be provided.

Such a pump or motor producing, for example, four fluid-flows is intended for high pressures, performances, and efficiencies and reduces or eliminates the drawbacks of the known four-flow pumps thereby permitting to design and realize four-wheel drives for land vehicles and four-propeller or four-flow drives for aircraft. The pump according to the invention may of course also be used for general, less exacting purposes in the industry, because this construction is simple and therefore not too expensive.

In accordance with the invention, the result is obtained by providing in the rotor, for example, four groups of cylinders receiving and delivering the fluid of which two groups are associated with passages conducting the fluid in one axial direction and the other two groups with passages conducting the fluid in the other axial direction. The fluid passages terminate on the rotating end surfaces of the rotor which cooperate in a sliding and sealing relationship with opposite stationary end surfaces of pressure inserts which are formed with corresponding fluid inlet and outlet ports and passages. The sliding of the rotary motor end surfaces on the stationary end surfaces is made particularly tight by means of a contact pressure arrangement.

The pump comprises a housing 311 covered on the axial sides of the pump by closures or covers 316, 317. The rotor 301 is rotatably mounted in bearings 334 and provided with groups of cylinders 302–305 through which the pressure fluid circulates. The housing 311 also encloses a slide block 309, guide segments 310 therefor, a radial bearing 312 supported by the slide block 309 and a reaction ring 306 rotatable in the bearing 312. The reaction ring 306 may also be designed as a stationary member, and if a non-adjustable pump is provided, the slide block 309 and the guides 310 may be omitted.

Rotor 301 is formed with at least four groups of cylinders 302, 303, 304 and 305, cooperating with displacers or pistons 307. The volume of the working chambers increases during the intake stroke and decreases during the delivery or pressure stroke. The stroke of the pistons is produced by the reaction ring 306 against which the pistons apply by means of guide members or piston shoes 308 which may be held in their position by inner guide rings 315 received in corresponding recesses provided in the outer surface of rotor 301. In a known manner, each group of cylinders comprises a plurality of individual cylinders. The rotor 301 may be made in one piece with the driver shaft 335 or may receive the shaft in its bore and be secured to it by keying 345. The shaft 335 is, in addition, mounted in bearings 336.

In accordance with the invention, the groups of cylinders 302, 303, 304 and 305 are completely separated and cannot communicate with each other. The fluid is supplied and discharged in the axial direction and the respective fluid passages of two groups of cylinders extend in the one axial direction, and the passages of the other two groups extend in the other axial direction. Also in accordance with the invention, both of the axial ends of rotor 301 take the form of a rotary surface, for example, a radial plane or a spherical or conical end surface, and the fluid passages terminate on these surfaces forming rotor fluid ports. Thus, rotor ports 322, 323 of the cylinder groups 304, 305 lead to the lower end surface (as seen in FIG. 19), and ports 324, 325 of the cylinder groups 302, 303 lead to the upper end surface. Ports 322, 323, as well as 324, 325, are mutually offset in the radial direction, in accordance with the disposition of the respective cylinder groups.

In order to obtain a particularly tight sealing between the rotary and the fixed parts of the pump, and thereby, a high efficiency and capability of the pump to work under high pressures, there is provided, in accordance with the invention, to interpose between the outer connections and the rotor stationary pressure insets. The pressure inserts are provided at each axial end of the rotor and may be made of a one-piece construction or assembled of more pieces and are substantially intended to serve as intermediate members with tightly apply, with their inner end surfaces against the opposite conformable rotor end surface and which are formed with inlet and outlet ports and fluid passages connecting the ports to the outer connections of the pump. In the present embodiment, shown in FIG. 19, at each axial end of the rotor 301, there are provided two partial pressure inserts, an outer one 318 or 321, and an inner one 319 or 320, mounted between the respective cover 316, 317 and the rotor and coaxially surrounding the shaft 335. A corresponding number of passages is provided in the pressure inserts, in the present case, two outlet passages 332, 333 or 330, 331 and two inlet passages 328, 329 or 326, 327 which are mutually offset in radial direction and operatively aligned with the associated two groups of rotor ports 322, 323, 324, and 325. The contact surface or surfaces of the pressure inserts, i.e., the surfaces by which they operatively apply against the rotor, may be continuous or divided in radially inner and outer surfaces and may be axially spaced from each other. In the embodiment of FIG. 19, the inner pressure insert 319 or 320 is placed in a bore of the outer pressure insert 318 or 321, and is fixed in the latter against rotation but can move axially relative thereto. The shaft 335 extends through the bores of the inner pressure inserts 319 and 320.

The inner end surfaces or contact surfaces of the pressure inserts are stepped in conformity with the shape of the rotor 301 so that two in axial and radial direction mutually offset and separate partial contact surfaces are formed both on the rotor and on the pressure inserts. Consequently, each group of rotor ports 325, 324, 323, 322 is associated with the corresponding inlet and outlet ports on the stationary contact surfaces of the pressure inserts applying against the rotor end surfaces. The respective fluid passages 326-333, provided in the pressure inserts, terminate with axially outer ports and connect the inlet and outlet ports adjacent the inner end surfaces, i.e., the stationary contact surfaces and thereby the rotor ports 322-325 to the associated pump connection passages 337-344 provided in the covers 316, 317 leading to the outer inlet and outlet connections of the pump. None of these passages communicates with any other. Therefore, the fluid flows passing through the pump remain separated from each other and, provided the pistons have mutually equal cross-sectional areas and strokes, the rates of flow are equal to each other in all four flows, irrespective of their internal pressure. If the displacements are mutually different, the rates of flow are no more equal, but in another fixed proportion, to each other. Instead of maintaining the equal or proportional flow volumes, the flows may also be interconnected so that the individual flows merge. However, this is seldom desired and the main advantage of the inventive machine is just the arrangement permitting to hold the individual fluid flows completely separated from each other and thus to maintain the equality of proportionality of the rates of flow whatever the pressure may be. In the embodiment shown, the pistons 307 have a single reaction ring 306 which is common to all of them. The mutual equality or proportionality of the different rates of flow is thereby produced forcibly. In addition, it is also possible to associate each group of cylinders with an individual reaction ring. Such a ring may provide for a constant or adjustable stroke. An arrangement of four or more independently adjustable reaction rings for a corresponding number of different fluid flows is particularly useful, for example, in the design of construction machines, excavators, cranes or machines having to operate in several different locations at different speeds or in a controlled manner. By individually controlling the stroke of different groups of cylinders, the working members to be driven can be accurately controlled as to their speed and direction of motion. The arrangement with a common reaction ring 306, shown in FIG. 19, on the other hand, is particularly expedient for vehicles with a four-wheel drive or for assuring the synchronism of four or eight aircraft propellers. In such cases, motors of mutually equal capacities are forced to rotate at mutually equal speeds because they are supplied with mutually equal pressure fluid volumes by a machine in accordance with the invention.

The control surfaces of the pressure inserts 318-321 operatively apply against the conformable contact or end surfaces of the rotor 301. In normal cases, i.e., if no pressure inserts are used, the fitting tolerance between the contact surfaces is substantially constant but must be very small if an appropriate sealing is to be obtained. By using pressure inserts, in accordance with the invention, this sealing contact is considerably improved. Each pressure insert has an eccentric shoulder engaging in a corresponding eccentric recess provided in the respective cover 316, 317 so that two different axially outer surfaces are formed on each pressure insert which is tightly fitted in the cover. Consequently, two narrow pressure chambers are formed at the axially outer side of each pressure insert, for example, the chambers 345, 346 at the pressure insert 319, the fluid pressure in these chambers urging the pressure inserts in axial direction tightly into a sealing contact with the respective rotor end surfaces. The eccentricity plane of the eccentric parts of the pressure inserts 318-321 is approximately peppendicular to the eccentricity plane of the stroke adjusting slide block. In case the machine is intended for delivering in both directions, pressure chambers of mutually equal size are provided on each of the pressure inserts. The active area of the pressure chambers is provided slightly, for example, by 3 to 9% larger than the corresponding contact area between the cooperating end surfaces if mutually equal pressure conditions are considered.

Thus, a particularly reliable, tight, low friction machine is obtained for the control of four or more fluid flows which is very efficient even at high pressures. Moreover, the construction of the machine is simple and uses a shaft extending therethrough so that further mechanical power may be drawn off or further pumps may be connected thereto.

For an accurate calculation of the dimensions and eccentricities of the pressure inserts of the pump, the following proven rules are to be applied:

(1) The active area of the respective pressure chamber is 1.06 times larger than the respective contact surface area considered under equivalent high pressure conditions.

(2) The center of gravity of the respective portion of the contact surface must be spaced from the central axis by the same distance as the center of gravity of the active area of the pressure chamber; thus, with $G_c$=radial distance of the center of gravity of the respective portion of the contact surface and $g_c$=radial distance of the center of gravity of the active area of the pressure chamber:

$$g_c = G_c \tag{1}$$

(3) Equality of the active areas of the pressure chambers follows the equation:

$$r_m = \sqrt{(r_0^2 + r_1^2)/8} \tag{2}$$

the $G_c$-values being calculated as $$G_c = \frac{2(R_0^3 - R_1^3)}{3(R_0^2 - R_1^2)} \times \frac{\sin\alpha_2 - \sin\alpha_1}{\alpha_2 - \alpha_1} \quad \text{with } \alpha \text{ in arc measure} \tag{3}$$

and $$g_c = \frac{\theta\pi}{540} \left[ \left( r_0 - \frac{e^2}{4r_0} + \frac{e\sin\alpha}{\text{arc}\,\theta} - \frac{e\sin(\alpha-\theta)}{\text{arc}\,\theta} + \frac{e^2\sin 2\alpha}{8r_0\,\text{arc}\,\theta} - \frac{e^2\sin(\alpha-\theta)}{8r_0\,\text{arc}\,\theta} \right)^3 - r_1^3 \right] \cos\left(\alpha - \frac{\theta}{2}\right) d\alpha / \overline{K}_1 \tag{4}$$

These relations assure the reliability in operation as well as the efficiency of the control body and are very important. Only by complying with these conditions can an absolute reliability in operation under high pressure be ensured.

While specific embodiments of the invention have been shown and described in detail to illustrate the application of the principles of the invention, it will be understood that the invention may be embodied otherwise without departing from such principles.

What is claimed is:

1. A vehicle capable of travel on the ground including highways and in the air, comprising a body including a cabin, a chassis including a substructure with wheels adapted for lowering and retraction within a certain distance below said body, cantilever extensions projecting from said body in the traveling direction both forwardly and backwardly relative to said cabin and forming trifurcate supporting arms defining propulsion spaces, a plurality of propeller shroud members defining air ducts hinged to said supporting arms within said propulsion spaces and adjacent each other and adapted to be adjusted in any angular position in the travel direction within a suitable range, a rotary hydraulic motor mounted in each of said shroud members and comprising an output shaft and at least one rotor for driving said shaft, a propeller mounted on each of said shafts within said shroud member, means for simultaneously adjusting said shroud members in their angular position, hydraulic pump means for producing a plurality of separate fluid flows non-communicating with one another and constituting self-contained hydraulic circuits equal in number to the number of said rotors and having proportional rates of flow, each of said rotors being connected in a single one of said separate hydraulic circuits, said hydraulic pump means including at least one driving engine being located on said lowerable substructure for improving the stability of the vehicle in the air, means for lowering, and retracting said substructure permitting the lowering of the center of gravity of the vehicle while in the air and to land smoothly on a highway, means for adjusting said shroud members in their angular position connected to said body, a plurality of inlet and outlet connection means on said pump means and motors corresponding to the number of said hydraulic circuits, hydraulic conduits interconnecting said inlet and outlet connection means, and means for steering the vehicle and controlling said engines, hydraulic pump means, hydraulic motors, adjustment of said shroud members, and lowering or retraction of said substructure.

2. The vehicle, according to claim 1, wherein said means for lowering and retracting said substructure comprises a foldable bar structure hinged to said body of the vehicle, said bar structure unfolding automatically under the weight of said substructure increased by the weight of said hydraulic pump means including said engines as soon as the vehicle starts to ascend and retracting again as the vehicle begins to touch the ground while landing.

3. The vehicle, according to claim 1, wherein said means for adjusting said shroud members in their angular position comprises crank arm members fixed to each of said shroud members, a bars-structure mounted on said body and hinged to said crank arm members for simultaneous angular displacement of the same about their axes of rotation.

4. The vehicle according to claim 1, comprising eight of said shroud members, propellers, and hydraulic motors disposed by twos in said propulsion spaces, four ahead in the travel direction of the vehicle, before said cabin, and four in the rear, said hydraulic pump means including four pump units, each producing four of said separate fluid flows, each of said hydraulic motors comprising a first and a second rotor, said hydraulic conduits connecting said first and second rotors of the foremost and the rearmost motors separately to two different of said pump units and said first and second rotors of the inner motors to different ones of the remaining ones of said pump units, and interconnecting said fluid inlet and outlet connection means so that the propellers at the lefthand side and the righthand side are rotatable in mutually opposite directions in the travel direction of the vehicle.

5. The vehicle according to claim 1, comprising four of said shroud members, propellers and hydraulic motors disposed by twos ahead and in the rear in the travel direction of the vehicle, said hydraulic pump means including two pump units each producing four of said separate fluid flows, each of said hydraulic motors comprising a first and a second rotor, said hydraulic conduits connecting said first rotors of all of said hydraulic motors to one of said pump units and said second rotors to the other of said pump units and interconnecting said fluid inlet and outlet connection means so that the propellers on the lefthand side and on the righthand side are rotatable in mutually opposite directions in the travel direction of the vehicle.

6. The vehicle of claim 1, wherein said hydraulic conduits include deformable fluid line portions capable of following said lowering and retraction of said substructure.

7. The vehicle of claim 1, wherein said substructure includes means for setting said hydraulic pump means and said at least one driving engine at least partially into the airstream below said body for cooling said hydraulic pump means and said at least one engine during travel of said vehicle in the air.

8. The vehicle of claim 1, wherein said substructure includes means for keeping said substructure, said hydraulic pump means and said at least one engine substantially parallel to the bottom of said body and thereby parallel to the direction of travel when said substructure is in the lowered or retracted location.

9. A vehicle, capable of travel on the ground including on highways and in the air, comprising a body including a cabin, a chassis including a substructure with wheels adapted for lowering and retraction within a certain distance below said body, extensions projecting from said body in the travelling direction both forwardly and backwardly relatively to said cabine and forming supporting arms defining propulsion and carrying spaces with pairs thereof adjacent to each other, a plurality of at least partially airfoil-shaped ducts fastened to said supporting arms and partially forming wing-shaped portions under an angle inclined relatively to the direction of travel of said vehicle for providing additional carrying force to said vehicle when air flows over said airfoil-shaped ducts and said wing-shaped portions during forward movement of said vehicle;

a rotary hydraulic motor, mounted in each of said ducts and comprising an output shaft and at least one rotor for driving said shaft, a propeller mounted on each of said shafts within said ducts;

hydraulic pump means for producing a plurality of separate fluid flows non-communicating with one another and constituting self-contained hydraulic circuits equal in number to the number of said rotors and having proportional rates of flow, each of said rotors being connected in a single one of said separate hydraulic circuits, said hydraulic pump means including at least one driving engine being located on said lowerable substructure for improving the stability of the vehicle in the air, means for lowering and retracting said substructure permitting the lowering of the center of gravity of the vehicle while in the air and to land smoothly on said ground including on said highways;

a plurality of inlet and outlet connection means on said pump means and motors corresponding to the number of said hydraulic circuits, hydraulic conduits interconnecting said inlet and outlet connection means, and means for steering the vehicle and controlling said engines, hydraulic pump means, hydraulic motors, and lowering or retraction of said substructure.

10. The vehicle of claim 9, wherein said hydraulic conduits include deformable fluid line portions capable of following said lowering and retraction of said substructure.

11. The vehicle of claim 9, wherein said substructure includes means for setting said hydraulic pump means and said at least one driving engine at least partially into the airstream below said body for cooling said hydraulic pump means and said at least one engine during travel of said vehicle in the air.

12. The vehicle of claim 9, wherein said substructure includes means for keeping said substructure, said hydraulic pump means and said at least one engine substantially parallel to the bottom of said body and thereby parallel to the direction of travel when said substructure is in the lowered or retracted location.

13. The vehicle, according to claim 9, wherein said means for lowering and retracting said substructure comprises a foldable bar structure hinged to said body of the vehicle, said bar structure unfolding automatically under the weight of said substructure increased by the weight of said hydraulic pump means including said engines as soon as the vehicle starts to ascend and retracting again as the vehicle begins to touch the ground while landing.

14. The vehicle according to claim 9, comprising eight of said ducts, propellers, and hydraulic motors disposed by twos in said propulsion spaces, four ahead in the travel direction of the vehicle, before said cabin, and four in the rear, said hydraulic pump means including four pump units, each producing four of said separate fluid flows, each of said hydraulic motors comprising a first and a second rotor, said hydraulic conduits connecting said first and second rotors of the foremost and the rearmost motors separately to two different of said pump units and said first and second rotors of the inner motors to different ones of the remaining ones of said pump units, and interconnecting said fluid inlet and outlet connection means so that the propellers at the lefthand side and the righthand side are rotatable in mutually opposite directions in the travel direction of the vehicle.

15. The vehicle according to claim 9, comprising four of said ducts, propellers and hydraulic motors disposed by twos ahead and in the rear in the travel direction of the vehicle, said hydraulic pump means including two pump units each producing four of said separate fluid flows, each of said hydraulic motors comprising a first and a second rotor, said hydraulic conduits connecting said first rotors of all of said hydraulic motors to one of said pump units and said second rotors to the other of said pump units and interconnecting said fluid inlet and outlet connection means so that the propellers on the lefthand side and on the righthand side are rotatable in mutually opposite directions in the travel direction of the vehicle.

16. A vehicle capable of travel on the ground including on highways and in the air, comprising a body including a cabin connected to a substructure, adapted for lowering and retraction within a certain distance below said body, holding extensions projecting from said body in the travelling direction both forwardly and backwardly relatively to said cabin and forming at least two supporting-arm-structures for holding propulsion members thereon; at least one hydraulic motor mounted on each of said supporting-arm-structures and comprising an output shaft and at least one rotor for driving said shaft, a propeller mounted on each of said shafts; hydraulic pump means for producing a plurality of separate fluid flows non-communicating with one another and constituting self-contained hydraulic circuits equal in number to the number of said rotors and having proportional rates of flow, each of said rotors being connected in a single one of said separate hydraulic circuits, said hydraulic pump means including at least one driving engine being located on said lowerable substructure for improving the stability of the vehicle in the air, means for lowering and retracting said substructure permitting the lowering of the center of gravity of the vehicle while in the air and to land smoothly on said ground including on said highways;

a plurality of inlet and outlet connected means on said pump means and motors corresponding to the number of said hydraulic circuits, hydraulic conduits interconnecting said inlet and outlet connection means, and means for steering the vehicle and controlling said engines, hydraulic pump means, hydraulic motors, propellers and lowering or retraction of said substructure.

17. The vehicle of claim 16, wherein said hydraulic conduits include deformable fluid line portions capable of following said lowering and retraction of said substructure.

18. The vehicle of claim 16, wherein said substructure includes means for setting said hydraulic pump means and said at least one driving engine at least partially into the airstream below said body for cooling said hydraulic pump means and said at least one engine during travel of said vehicle in the air.

19. The vehicle of claim 16, wherein said substructure includes means for keeping said substructure, said hydraulic pump means and said at least one engine substantially parallel to the bottom of said body and thereby parallel to the direction of travel when said substructure is in the lowered or retracted location.

20. The vehicle, according to claim 16, wherein said means for lowering and retracting said substructure comprises a foldable bar structure hinged to said body of the vehicle, said bar structure unfolding automatically under the weight of said substructure increased by the weight of said hydraulic pump means including said engines as soon as the vehicle starts to ascend and retracting again as the vehicle begins to touch the ground while landing.

21. The vehicle according to claim 16, comprising eight of said propellers, and hydraulic motors disposed by twos, four ahead in the travel direction of the vehicle, before said cabin, and four in the rear, said hydraulic pump means including four pump units, each producing four of said separate fluid flows, each of said hydraulic motors comprising a first and a second rotor, said hydraulic conduits connecting said first and second rotors of the foremost and the rearmost motors separately to two different of said pump units and said first and second rotors of the inner motors to different ones of the remaining ones of said pump units, and interconnecting said fluid inlet and outlet connection means so that the propellers at the lefthand side and the righthand side are rotatable in mutually opposite directions in the travel direction of the vehicle.

22. The vehicle according to claim 16, comprising four of said propellers and hydraulic motors disposed by twos ahead and in the rear in the travel direction of the vehicle, said hydraulic pump means including two pump units each producing four of said separate fluid flows, each of said hydraulic motors comprising a first and a second rotor, said hydraulic conduits connecting said first rotors of all of said hydraulic motors to one of said pump units and said second rotors to the other of said pump units and interconnecting said fluid inlet and outlet connection means so that the propellers on the lefthand side and on the righthand side are rotatable in mutually opposite directions in the travel direction of the vehicle.

* * * * *